Nov. 14, 1961

F. G. BOUCHER 3,008,521

SOLVENT FORMATION TESTING

Filed Sept. 10, 1956

Frank G. Boucher  Inventor

By W. O. T. Heilman  Attorney 3,008,521
SOLVENT FORMATION TESTING
Frank G. Boucher, Catoosa, Okla., assignor, by mesne assignments, to Jersey Production Research Company
Filed Sept. 10, 1956, Ser. No. 608,846
7 Claims. (Cl. 166—4)

The present invention relates broadly to well testing and more particularly to the testing of a subterranean formation for its hydrocarbon content. The invention especially relates to a method and apparatus for testing a possible oil bearing formation by forcing a solvent into the formation, and thereafter withdrawing the solvent and testing it for its mineral hydrocarbon content.

Well testing is a continuing problem in the petroleum producing industry. Essentially, well testing has as its general objective the detection of petroleum hydrocarbons in formations that are penetrated by a drilling operation. Generally speaking, well testing is carried out by periodically interrupting a drilling process and giving formation fluids an opportunity to escape from a formation into the well bore. Once within the well bore, the fluids are withdrawn to the surface of the earth and are subjected to conventional physical or chemical procedures for detecting hydrocarbons.

Although the importance and general principles of well testing techniques are well known, nevertheless no completely satisfactory well testing procedure has been developed to date. All too often, economically productive oil sands have been missed due to inaccurate or insufficient well test information. In some instances it has been observed that drilling mud, which is conventionally used in rotary drilling operations, may plug a formation and thereby prevent fluids including oil from leaving the formation and entering a well bore. In other instances, a formation penetrated by a well may not possess the required native pressure to enable fluids to be driven from the formation into a well bore.

There are numerous other conditions which may be responsible for inaccurate well tests, but it is not a purpose of the present description to enter into a lengthy discussion of such conditions. Instead, it is a purpose of this description to present an invention whose object it is to provide a procedure for testing subterranean formations for their hydrocarbon contents. It is a more particular object of the invention to provide an apparatus and method of well testing which is more universally reliable and useful than are presently conventional well testing techniques.

These and related objectives, which will be explicitly considered or readily apparent in the following description, are attained in accordance with the present invention by injecting an oil-miscible fluid into a formation from an enclosed chamber within a bore hole that penetrates the formation. Following its injection into the formation, the oil-miscible fluid is withdrawn from the formation and returned to the enclosed chamber, whence it is removed to the surface of the earth for detection of any mineral hydrocarbons that it may contain.

The invention may be better understood by reference to the attached drawing which forms part of this description.

Figure 1:
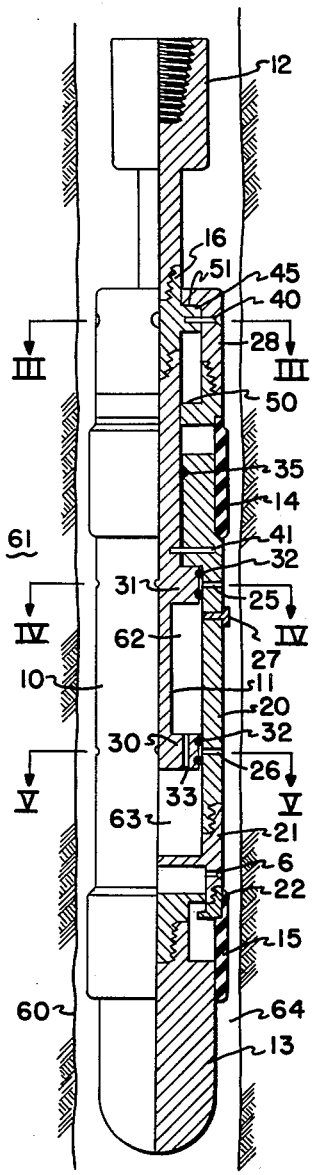
FIGURE 1 illustrates in a partially sectioned view a well testing device which embodies the teaching of this invention. The apparatus is depicted in this figure as it appears in being lowered within a bore hole.
Figure 2:
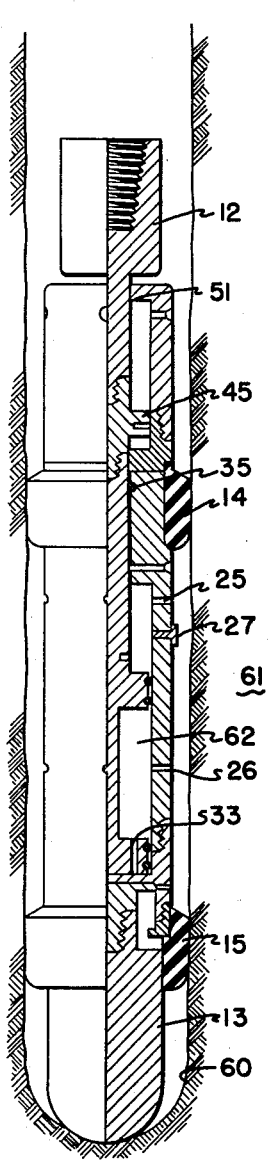
FIGURE 2 illustrates the apparatus of FIGURE 1 as it appears in a set condition opposite a formation to be sampled.
Figure 3:
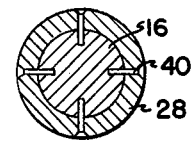
FIGURE 3 is a section view taken along the section line III—III of FIGURE 1.
Figure 4:
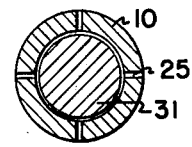
FIGURE 4 is a section view taken along the section line IV—IV of FIGURE 1.
Figure 5:
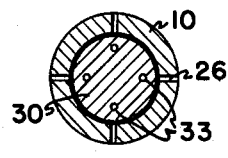
FIGURE 5 is a section view taken along the section line V—V of FIGURE 1.

Referring first to the drawing, it will be seen that the apparatus illustrated there includes a hollow cylindrical member 10, a mandrel 11, a coupling 12, a standoff member 13, two sleeve packers 14 and 15, and a connector 16.

The cylinder member 10 is closed near its lower end and is preferably fabricated from several component parts as shown for ease of manufacture and assembly. Thus, in the drawing cylinder member 10 consists of an upper main body member 20, a cylinder cap member 21, and a cylindrical extension member 22. A set of upper wall ports 25 and a set of lower wall ports 26 are provided within cylinder 10 to enable fluid to pass through the wall of this member. A filling connection 27 is also provided slightly below the upper ports 25 in order that fluid may be introduced within the cylinder member or withdrawn therefrom.

Attached to the upper and lower ends of cylinder member 10 are two sleeve packers 14 and 15. The upper packer 14 connects the cylinder member to an upper collar 28, and the lower packer 15 connects the cylinder member to the standoff 13.

Mandrel 11 is positioned within upper collar 28 and cylinder member 10 and is adapted to move longitudinally therein. The mandrel is provided at its lower end with a piston element 30 and at an intermediate portion with a second piston element 31. Both piston elements are adapted to move vertically within the lower portion of the cylinder member 10, and they are provided with seal rings or equivalent sealing devices 32 for maintaining fluid-tight relationships between the piston members and the cylinder member. The lower piston element 30 as shown is provided with a plurality of vertically disposed ports 33 establishing fluid communication through this particular element.

The portion of the mandrel 11 which extends above upper piston element 31 possesses a greater diameter than the portion between the two piston elements, and this larger diameter portion is adapted to move vertically in a fluid-tight manner with an upper portion of the cylinder member 10 which has a reduced diameter. Sealing means 35 may be provided between these upper portions of the cylinder member and the mandrel to provide an effective fluid-tight relationship therebetween.

The upper end of mandrel 11, as mentioned earlier, is connected to connector 16, which in turn is connected to coupling 12. Coupling 12, in turn, is threaded or otherwise adapted to be connected to the lower end of a string of well pipe.

Two sets of shear pins or equivalent releasable means are provided in the overall structure to maintain the mandrel in a fixed position relative to the collar 28 and the cylindrical member 10 and the standoff 13 as the apparatus is lowered within a well bore. An upper set of shear pins 40 interconnect connector 16 with collar 28, and a lower set of shear pins 41 connect mandrel 11 with cylinder member 10.

Returning momentarily to the piston members 30 and 31 of mandrel 11 and to the ports 25 and 26 in the cylinder member 10, it should be noted that the ports are arranged to be directly opposite and sealed by the piston members when the latter members are in a vertically upward position within the cylinder member. In other words, the piston members seal the ports and prevent the flow of fluids therethrough, when the overall tool is in condition for lowering within a bore hole.

It will also be noted that the standoff 13, the cylinder member 10 and the upper collar 28 are depicted as being fabricated from two or more component parts. It will be recognized that division into parts is necessary to facilitate construction and fabrication of the equipment and does not vitally concern the functioning or operation of the equipment.

Returning to the connector 16 for the moment, it will be seen that this member is provided with a shoulder 45 which is of greater diameter than the connector proper; and it will be additionally noted that this shoulder slides within collar 28. Upper and lower internal shoulders 50 and 51 disposed within collar 28 limit vertical movement of the connector relative to the collar.

Having briefly enumerated and described the various components of the apparatus which is illustrated in the drawing, attention is now directed toward a consideration of the manner in which this apparatus operates. Accordingly, it will be assumed that the apparatus has been lowered within a bore hole 60 which is filled with drilling mud, and that it is desired to obtain a sample of fluids that may exist within a formation 61 which surrounds the hole. It will further be assumed that the interior portions 62 and 63 of the cylinder member 10 have been filled with an oil-miscible liquid prior to lowering of the tool within the hole 60. Filling of the cylinder member with the liquid can be readily attained, as mentioned earlier, through the fill hole 27. Complete filling of the cylinder member is preferably avoided so that some comparison of the fluid within the cylinder member is possible. Incomplete filling is readily and automatically made possible by simply placing the filling connection 27 slightly below and spaced from the lower end of the upper piston element 31, as shown. Ports 26 may also be positioned relatively near the valve or piston element 30 so that these ports are uncovered upon small displacements of the piston element within the cylinder member 10.

Referring specifically to the oil-miscible liquid for the moment, it should be observed that this liquid may be selected from any one of a large group of conventional liquid solvents for oil. The liquid, however, should preferably be of a type that can be readily distinguished from petroleum hydrocarbons such as exist within subterranean formations. Detection and analysis of the formation fluids that are obtained by the use of the apparatus are thereby greatly facilitated. Particularly suitable solvents for use in connection with the invention are therefore materials such as halogenated hydrocarbons including carbon tetrachloride and ethylene dibromide; carbon disulfide; ketones such as acetone and methylethyl ketone; alcohols such as ethyl alcohol and benzyl alcohol; phenol; and the like. Mixtures of solvents may also be employed as desired. Solvents that are especially preferred for the purposes of the invention are carbon tetrachloride and carbon disulfide in view of their extreme miscibility with substantially all types of petroleum hydrocarbons and mineral oils.

With the above assumptions in mind, and further assuming that the apparatus has been lowered to a position directly opposite the structure 61 to be sampled, attention is now directed first to FIGURE 1. There it will be seen that mandrel 11 and its piston members 30 and 31 are in a vertically upward position relative to the cylinder member 10. It will further be observed that shear pins 40 and 41 are in position and that these pins have maintained the mandrel, the standoff and the collar and cylinder member in the positions shown.

To initiate the sampling operation, the well pipe to which the coupling 12 is attached is lowered so that the bottom of the standoff 13 rests against the bottom of the bore hole. Loading on the well pipe is increased—as by releasing additional weight at the surface of the earth—until the packers 14 and 15 are expanded and set against the wall of the bore hole. Seating of the upper packer results from a loading which is transferred from the well pipe through the coupling 12, the connector 16, the shear pins 40 and the collar 28; and seating of the lower packer 15 is achieved by a thrust transmitted from a well pipe through the coupling 12, connector 16, mandrel 11 and the shear pins 41 and the cylinder member 10. Drilling mud within the cylindrical extension 22 escapes through port 6.

In the operation of setting the packers 14 and 15, it will be recognized that the shear pins 40 and 41 must resist a shearing action until the packers have set. Thus, a thrust downward through the coupling 12 and the mandrel 11 causes the two packers to "cold flow" or otherwise flex so as to be squeezed against the wall of the surrounding borehole before the shear pins are sheared. It is preferred, of course, that the lower packer 15 be adapted to set before the upper packer 14 so that movement of the upper packer along the wall of the borehole is avoided.

After the packers have been seated, continued loading on the mandrel 11 shears the pins 40 and 41 and causes the mandrel to move vertically downward relative to the collar 28 and the cylinder member 20. It will be noted that collar 28 must be heavy enough to keep the packers seated after the pins have been sheared.

As the mandrel moves in a downward direction, the ports 25 and 26 are exposed, and solvent within the cylinder 10 flows outwardly through the port 26. Solvent below piston 30 flows past the piston through port 33 and thence through port 26 into the annular space 64 between the cylinder 10 and the wall of the bore hole. Solvent continues to flow in this fashion from the cylinder to the annular space until piston 30 reaches the bottom of the liner.

Since packers 14 and 15 are firmly set before solvent is ejected from cylinder 10, it follows that pressure is rapidly built up within the annular space between the cylinder and the bore hole. Due to this increase in pressure at least part of the solvent is injected into the formation and there mixes with any mineral hydrocarbons that may be present in the formation. Some drilling mud is also apt to enter the formation, but the amount of mud is quite limited in comparison with the volume of solvent available. Furthermore, ports 25 are located such that a substantial portion of the mud in the annular space between the packers can flow into the cylindrical volume created between the upper surface of piston element 31 and the wall portion of the cylinder 10 as the piston moves downwardly relative to the cylinder.

Once the solvent has been injected from within the cylinder into the annular space and thence into the formation surrounding the bore hole, a reverse sequence of operations is employed to withdraw the solvent from the formation along with any hydrocarbons with which it may have become associated. This reverse sequence of operations is initiated by removing the load that was created on the tool by lowering the well pipe on the connector 12. Thus, the drill string is raised vertically thereby lifting the connector 12 and its attached mandrel 11. Vertical movement of the mandrel causes the piston elements 30 and 31 to move upwardly thereby withdrawing solvent and formation fluids from the formation 61 and entrapping them within the cylinder 10. Withdrawal of the solvent is continued until the upper piston 31 engages the shoulder formed by the reduced diameter of the upper portion of the cylinder; and sealing of ports 25 and 26 occurs when the piston elements reach their upward limit of travel. At this point solvent and associated reservoir fluids are sealed within cylinder 10 i.e., interior portions 62 and 63, and drilling fluid has once again been expelled from the cylinder and returned to the annular bore hole space.

Following closure of the ports 25 and 26, shoulder 51 of connector 16 abuts against the shoulder 45 of collar 28, and unseating of packers 14 and 15 thereby occurs. With the unseating of the packers the tool is once more in condition for travel to the surface of the earth; and the tool is at this time retracted from the bore hole.

While the foregoing description and the attached drawing illustrate one operative embodiment of this invention, it will be appreciated that a number of variations and modifications may be incorporated within the embodiment described above without departing from the spirit or scope of the invention. For example, it is contemplated that other type packers such as balloon packers, hook wall packers, etc. may be readily adapted for the purposes of the invention. Again, a wide variety of solvents may be used with the invention; and a list of suitable compounds has been presented earlier in this description. It will be apparent that the apparatus may be constructed from various metals and alloys, depending upon the types that are available and suitable for use in any given instance.

Once the apparatus of this invention has been employed in a bore hole and a sample of formation fluid has been obtained, further handling and testing of the fluid may be carried out in any conventional manner. Since it is a primary object of the invention to detect mineral oil hydrocarbons in the formation fluids that are obtained, it will be recognized that analytical and detection apparatus for detecting and analyzing mineral oil hydrocarbons are especially intended and preferred. Thus, it is contemplated that analytical instruments such as mass spectrometers, infra-red spectrometers, and other analytical instruments utilizing the adsorption of radiant energy may be used. Similarly, physical-type analytical instruments such as distillation equipment, viscosimeters, hydrometers and the like may be employed. Also, it is contemplated that various chemical tests for specific or general classes of mineral oil hydrocarbons may be used as desired.

I claim:

1. A method of testing a subterranean formation from a well bore which comprises positioning a chamber containing liquid miscible with and distinguishable from the petroleum hydrocarbons of said formation within the well bore substantially opposite the formation, effecting seals at upper and lower portions of the annular space between the chamber and the wall of the well bore, injecting said liquid from the chamber through the portion of said annular spaces between said seals into said formation, withdrawing said liquid from said formation into said chamber, releasing said seals, removing said chamber to the surface of the earth and analyzing said liquid for fluids other than said liquid.

2. A method as defined in claim 1 in which the liquid is carbon tetrachloride.

3. A method as defined in claim 1 in which the liquid is carbon disulfide.

4. An apparatus for testing a subterranean formation from a well bore which comprises an elongated cylinder adapted to contain an oil-miscible liquid, a piston movably disposed within said cylinder, the upper end of said piston being adapted to be connected to the lower end of a string of well pipe, means connected to said cylinder to support said cylinder within a well bore substantially opposite a formation to be sampled, packers attached to upper and lower peripheries of said cylinder and operable to pack off the annular space between said cylinder and the wall of the bore hole, at least one fluid passageway in the wall of said cylinder vertically intermediate said packers, and valve means cooperable wtih said piston to open said passageway upon the start of the compression stroke of said piston within said cylinder and to close said passageway upon the termination of the suction stroke of said piston within said cylinder, said passageway providing egress of fluid from said cylinder during a compression stroke and ingress of fluid during a suction stroke.

5. An apparatus for testing a subterranean formation from a well bore penetrating the formation which comprises an elongated hollow cylinder adapted to contain an oil-miscible liquid, means attached to said cylinder to secure said cylinder within the well bore laterally opposite said formation, a mandrel, a piston element at the lower end of said mandrel adapted to move vertically within said cylinder, a coupling at the upper end of said mandrel adapted to be connected to the lower end of a string of well pipe, two vertically spaced packers on said cylinder, a fluid passageway in the wall of said cylinder intermediate said packers, means operable to set said packers, valve means connected to said mandrel and cooperable with said cylinder upon compressive movement of said mandrel relative to said cylinder to open said passageway, said valve means upon suction movement of said mandrel relative to said cylinder cooperating with said cylinder to close said passageway.

6. An apparatus for testing a subterranean formation from a well bore penetrating the formation which comprises an elongated hollow cylinder adapted to contain an oil-miscible liquid, a mandrel including a piston adapted to slide within said cylinder, one end of said mandrel extending from said cylinder and adapted to be connected to the lower end of a string of well pipe, a collar member spaced above said cylinder and surrounding an upper portion of said mandrel, frangible means interconnecting said collar and said mandrel, a first sleeve packer sealed at one end to said collar and at its opposite end to an upper portion of said cylinder, a support member below said cylinder and having limited movement with respect to said cylinder and adapted to rest upon the bottom of said well bore, a second sleeve packer sealed at one end to the lower portion of said cylinder member and at its opposite end to said support member, said collar member being of a mass sufficient to maintain both said packers in a set position, a fluid passageway in the wall of said cylinder intermediate said packers, a valve member connected to said mandrel adapted to close said fluid passageway when said piston is at its uppermost position within said cylinder and to open said fluid passageway when said piston is in positions within said cylinder other than its uppermost postion.

7. An apparatus for testing a subterranean formation from a well bore penetrating a formation which comprises an elongated hollow cylinder adapted to contain an oil-miscible liquid, a collar member at one end of said cylinder and longitudinally movable relative thereto, a first sleeve packer interconnecting said cylinder and said collar member, a support member at the opposite end of said cylinder and longitudinally movable relative thereto and adapted to rest upon the bottom of said well bore, a second sleeve packer interconnecting said cylinder member and said support member, said support member being adapted to support said cylinder apparatus within a borehole, a mandrel longitudinally movable within said collar member and said cylinder member, said mandrel member including a piston member disposed within said cylinder member, frangible means interconnecting said mandrel and said collar member, said collar member being of a mass sufficient to maintain both of said packers in a set position, one end of said mandrel extending beyond said collar member and adapted to be connected to the lower end of a string of well pipe, a fluid passageway in the wall of said cylinder intermediate said first and second packers, valve means connected to said mandrel, said valve means being operable upon the start of a compressive stroke of said piston within said cylinder to open said fluid passageway, said valve means being further operable to close said fluid passageway upon the completion of a suction stroke of said piston within said cylinder.

References Cited in the file of this patent

UNITED STATES PATENTS

| | | |
|---|---|---|
| 1,448,997 | Foggan | Mar. 20, 1923 |
| 2,170,355 | Stephens | Aug. 22, 1939 |
| 2,180,309 | Melton | Nov. 14, 1939 |
| 2,210,546 | Hassler | Aug. 6, 1940 |
| 2,227,731 | Lynes | Jan. 7, 1941 |
| 2,259,428 | Shelley | Oct. 14, 1941 |
| 2,342,424 | Newton | Feb. 22, 1944 |
| 2,449,627 | Sweeney | Sept. 21, 1948 |
| 2,796,937 | Haines et al. | June 25, 1957 |
| 2,838,119 | Collins | June 10, 1958 |